United States Patent [19]

Bonnans et al.

[11] Patent Number: 4,607,057

[45] Date of Patent: Aug. 19, 1986

[54] PROCESS FOR THE PREPARATION OF BEADS OF COPOLYMERS BEARING REACTIVE GROUPS, BY POLYMERIZATION IN SUSPENSION IN A NON-AQUEOUS MEDIUM

[75] Inventors: Chantal Bonnans, Le Mans; Guy Levesque, Saint Mars sous Ballon, both of France

[73] Assignee: Societe Nationale Elf Aquitaine, Courbevoie, France

[21] Appl. No.: 630,575

[22] Filed: Jul. 13, 1984

[30] Foreign Application Priority Data

Jul. 13, 1983 [FR] France ................... 83 11738

[51] Int. Cl.$^4$ ............................................. C08B 18/14
[52] U.S. Cl. ....................................... 521/52; 521/56; 524/708; 524/726; 524/729; 524/742; 524/743; 526/193; 526/204; 526/209; 526/210; 526/220; 526/222

[58] Field of Search ................... 521/52, 56; 526/193, 526/204, 209, 210, 220, 222; 524/708, 726, 729, 742, 743

[56] References Cited

U.S. PATENT DOCUMENTS

Re. 27,026  1/1971  Alfrey et al. .................. 260/2.5

Primary Examiner—Maurice J. Welsh
Attorney, Agent, or Firm—Burns, Doane, Swecker & Mathis

[57] ABSTRACT

The present invention relates to a process for the preparation of beads of copolymers bearing reactive groups, by polymerization in suspension in a non-aqueous medium. According to the invention a free radical polymerization is effected of at least two unsaturated monomers, of which one is the carrier of a reactive group such as acid chloride, alkyl chloride, alkyl dithiobenzoate or carboxyalkyl, in a medium composed of two emulsified, immiscible organic liquids, to form beads of chemically reactive copolymers.

15 Claims, No Drawings

PROCESS FOR THE PREPARATION OF BEADS OF COPOLYMERS BEARING REACTIVE GROUPS, BY POLYMERIZATION IN SUSPENSION IN A NON-AQUEOUS MEDIUM

FIELD OF THE INVENTION

The present invention relates to a process for the preparation, in a single step, of beads of copolymers bearing very reactive functional groups.

BACKGROUND TO THE INVENTION

The applications of such reactive polymers, upon which chemical or biochemical products or cells can be fixed according to the case, are numerous, but until now these beads of copolymers (crosslinked polymer or gels) could only be prepared in two steps. Indeed, in the known conditions of free radical polymerisation in suspension, this is performed either with monomers—like styrene in organic solution and in emulsion in water, or with more polar monomers—like the acrylamides—in aqueous solution and in emulsion in mineral oil, and at temperatures ranging from 30° to 80° C. for reaction times of 4 to 30 hours. In such conditions almost no functional group sufficiently reactive to be capable of coupling subsequently, according to the case, a chemical or biochemical product or a cell, is stable enough and it was not possible to introduce into the polymerisation medium monomers bearing the desired group without the, at least partial, destruction of this group by hydrolysis. Also the preparation was recommended in the first step of a polymer or copolymer bearing lateral groups stable in aqueous medium but capable of subsequently reacting with divalent entities which, upon fixation, create the desired reactive sites, and that in a second step called "activation" the reactive groups are introduced; this step frequently even being carried out by the user alone, with all the difficulties which that involves. It is possible to cite as examples the chloromethylation of polystyrene gels, the formylation of acrylamide copolymers used for coupling chiral amines and providing resins suitable for filling high pressure liquid chromatography columns used for the separation of enantiomers (J. Liquid Chromatog. 1 67 p.761 (1978)), or further the activation of acrylamide copolymers by cyanogen bromide to obtain gels that bind biological macromolecules. (FR-A-2.398.762).

GENERAL DESCRIPTION OF THE INVENTION

The process according to the invention consists in effecting the free radical polymerisation in a medium constituted from two immiscible organic liquids, forming an emulsion of one in the other, one of the phases called dispersed being the solvent of the monomers and the initiating agent, the other—or dispersing phase—assuring the dispersion of this solution so that the gels are obtained in the form of beads, spherules or small balls. In the case when the monomer is a liquid it can be used as a solvent.

When the process is applied, in addition to the monomer bearing the reactive group, to polar monomers, to obtain crosslinked polymer gels or hydrophilic beads, a polar liquid is used for the dispersed phase—so that the solubility of the monomers is sufficient—which is also inert with respect to free radicals while the other immiscible organic phase will be a saturated oil so that it does not participate in the polymerisation reaction.

The polar monomers are for example acrylamide, the N-(hydroxyalkyl)-acrylamides, acrylic acid, acrylonitrile or their mixtures; the polar liquid can be one of any of the polar solvents used in chemistry, stable in the presence of free radicals, and in particular dimethylformamide or dimethylacetamide, N-methylpyrrolidone, or other amides, hexamethylphosphotriamide, dimethylsulfoxide or sulfolane, ethylene or propylene carbonates, acetonitrile or other nitriles, the polyethyleneglycols and their ethers and esters. As for the second liquid phase which is immiscible with these polar solvents, it is usefully chosen from the mineral oils, such as vaseline oil, paraffin oil, silicon oils or the saturated vegetable oils.

When the process is applied, in addition to the monomer bearing the reactive group, to slightly polar or apolar monomers, such as styrene and its derivatives, the phase dissolving the monomers will be less polar than the dispersing phase. Thus, aromatic or aliphatic hydrocarbons—such as benzene—pure or in mixtures will be used as the monomer solvent. The dispersing phase could then be an immiscible glycol or one of its ethers or esters, such as ethylene or propylene glycol, polyethylene or polypropylene glycol, trimethylolpropane or their derivatives.

A preferred form of the embodiment of the invention consists in using a mixture of three monomers to obtain a three dimensional, crosslinked copolymer insoluble in water and reactive. One of the monomers will provide the backbone of the gel (or crosslinked polymer) and diverse properties of the gel such as hydrophily, polarity, polarisability, etc. will depend upon its structure.

The second monomer allows the crosslinking and in consequence requires at least two double linkages capable of opening up to give chains or rings. Finally, the last monomer bears the reactive group which the final gel will carry; the chemical structure of this monomer, qualified as a reactive, will depend therefore on the ultimate use of the reactive gel. When the latter must bind amino acids, peptides or proteins, it is the amino group of these molecules which reacts with the reactive gel and it can be imagined that it can carry any acylating group—such as an activated ester group, acid chloride, isothiocyanate, chlorocarbonate, or isocyanate—or an alkylating group such as a halogenomethylene radical as in the bromo and chloromethylstyrenes. Particularly recommended as reactive monomers are, according to the invention: acrylic and methacrylic acid chlorides, vinyl chloroformate, styrenic dithioesters, vinyl thioacetates, halogenoalkylstyrenes such as the bromomethyl and chloromethyl styrenes but also, to obtain groups reacting with side chains other than amino, vinyl pyridines, derivatives of aminostyrene, N-vinylacetamide or all other compounds bearing a reactive group and polymerizable by free radicals.

To obtain hydrophilic gels the process of polymerisation according to the invention is applicable to acrylic derivatives, as monomers of the backbone; those that can be most particularly cited are the acrylamides—especially acrylamide and methacrylamide and their mono and dialkyl, hydroxyalkyl or polyhydroxyalkyl derivatives, pure or in a mixture depending on the degree of hydrophily desired for the final gel; or further acrylic and methacrylic acids and esters, acrylic esters of mono and polyalcohols, acrylic esters and amides of aminoalcohols such as mono and polyethanolamines, aminopropanol and butanol, or the acrylo and methacrylonitriles and cyanoacrylates. But ethylenic derivatives, such as acetates and other esters of vinyl and styrene, can also be used. The monomer, bearing at least two polymerizable double linkages thus permitting crosslinking, can be a bis-acrylamide—such as methylene or polymethylene bis-acrylamide, a bisacrylate—such as those of glycols, a polyalcohol polyacrylate, a trisallylmellitate, or divinylbenzene (1,4 or a mixture of isomers).

Apart from the three monomers and the two immiscible liquids, the reaction medium will contain an initiating agent generating free radicals, chosen from among those generally used in cross linking polymerisation such as the peroxides, the peresters, the percarbonates, the azoic derivatives or a redox system soluble in the medium (peracid and thioamide such as urea). The polymerisation according to the invention can be advantageously realised in the presence of a blowing agent, whose nature is a function of that of the monomers and which allows the modulation of the specific surface and the porous volume of the crosslinked copolymer—it is known that certain aliphatic acids and alcohols and their amides and esters, as well as polyethers, are usable.

Lastly, according to a preferred method of realisation of the invention, a surface-active agent is added to the medium to facilitate the formation of the suspension and to stabilize it; non ionic surface active agents are preferred, the liquids used being poor solvents of ions, such as the fatty esters of disaccharides (Span R).

The process according to the invention is particularly advantageous in the numerous cases where "reactive" monomers polymerize less rapidly than the monomers forming the backbone. Indeed the former are incorporated rather at the end of the polymerisation reaction and are thus found at the surface of the beads. This results in an excellent accessibility, in the final crosslinked polymer, of almost all the reactive groups introduced, this is for example confirmed with acrylamide and hydroxyalkylacrylamide gels, the reactive monomers carrying a side chain capable of reacting with the amines.

DETAILED DESCRIPTION OF THE EMBODIMENTS

The embodiment of the process of polymerisation in suspension according to the invention is effected in a single reaction step which comprises:

(a) the putting into solution in an appropriate solvent—polar for a hydrophilic gel—of a mixture of:
  (1) the monomer which will form the backbone in a quantity such that it represents at least 50% by weight of the totality of solutes (monomers and diverse agents),
  (2) the crosslinkable monomer which can constitute 3 to 30% by weight of the solutes and preferably 5 to 25%, the insolubility in water of the crosslinked polymer only appearing for sufficient quantities of this compound; the rigidity of the beads of the crosslinked polymer depends on the quantity of monomer introduced,
  (3) the reactive monomer which constitutes 0.5 to 10% by weight of the solutes and preferably 3 to 5%, and the addition to this solution of the initiating agent (from 0.1 to 5% by weight of the total solutes) as well as, if necessary, the dissolution in the appropriately chosen dispersing phase of a small quantity of the surface active agent as well as the blowing agent, the latter in a quantity such that it represents from 0 to 50% by weight of all the solutes.

(b) the introduction of a solution of monomers into the dispersing phase to obtain upon vigorous shaking an emulsion of one phase in the other, (c) the maintenance of the mixture at the desired temperature, that is about 60° C., in the case of initiation by azoics, with mixing throughout the polymerisation reaction, this necessitating in general 15 to 30 hours preferably under an inert atmosphere; then the separation of the crosslinked polymer beads from the reaction medium by an appropriate method, such as decanting or pressing and the treatment of these beads by classical methods to eliminate solvents and residual monomers.

The crosslinked polymer beads obtained upon application of the process of polymerisation according to the invention are of a size which depends principally on the intensity of mixing and the quantity of surface-active agent introduced into the medium but also on the quantity of blowing agent at least if this is elevated, given the weak surface-active properties of these agents. In general the beads are of 0.1 to 3 mm in their largest dimension which allows the reactive gels to be used for numerous applications.

EXAMPLE 1

Copolymer of acrylamides bearing the carboxymethyl dithiobenzoate group

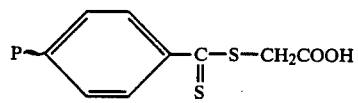

2.38 g of carboxymethyl vinyl-4 dithiobenzoate, prepared for example according to Makro-mol. chem. 182, 2409-19 (1981), 10.48 g of N-((tris-hydroxymethyl)methyl)acrylamide, 8.1 g of acrylamide and 2.16 g of N-N'-methylene bis(acrylamide) then 2 g of azo-bis-isobutyronitrile are dissolved in 100 ml of N-methylpyrrolidone.

This solution is placed in a 1 liter glass reactor containing 800 ml of vaseline oil and 40 drops of SPAN 80 ®. The mixture is carefully placed under an atmosphere of nitrogen and is mixed by the rotation of a vertical shaft bearing two screws of opposite pitch each having at least two blades, the assembly being of resistant PYREX ® glass for example, and is heated to 60° C. and maintained at this temperature for 20 hours, under high pressure nitrogen.

The formed crosslinked polymer beads, swollen with solvent, are isolated either by decanting or by pressing; the traces of oil are eliminated by washing the beads with hexane and the washes with methylene chloride. To use these crosslinked polymer beads as a support they are swollen with water before use then washed with water and then dried either in air or under reduced pressure, if it is necessary to eliminate all the water.

The yield of dry product is from 75 to 80% by weight of the monomers introduced.

The COOH acid groups of the reactive side chain

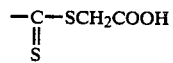

are measured by the suspension of the crosslinked polymer in a solution of NaCl at 1 mole/l, and the observation of the change in pH of the solution upon the progressive addition of an aqueous solution of 1/20N NaOH. It is thus determined that the polymer contains 0.047 meq/v per gram of acidic groups accessible to the reagent employed which, considering the result of the elementary analysis giving the percentage of S in the polymer, clearly shows that the great majority of the reactive groups are at the surface of the beads. The degree of swelling of the resins, in terms of the quantity of water in g retained per g of gel, is 3.5.

EXAMPLE 2

Copolymer of acrylamides bearing the carboxymethyl dithiobenzoate group (other operating conditions).

2.14 g of carboxymethyl vinyl-4 dithiobenzoate, 16.8 g of N-((tris-hydroxymethyl)methylacryl)amide, 12.34 g of acrylamide and 3.24 g of N-N'-methylene bis(acrylamide) then 3 g of azo-bis-isobutyronitrile are dissolved in 120 ml of N-methylpyrrolidone and the solution is poured into 800 ml of vaseline oil containing 40 drops of SPAN 80 ®. The mixture is maintained at 60° C. under nitrogen with vigorous mixing for 27 hours.

In these conditions the yield of crosslinked polymer is 95%; the measurement of the reactive acid group gives 0.035 meq/v of acid per gram of polymer.

The degree of swelling in water is close to 3.

EXAMPLE 3

Copolymer of acrylamides bearing the carboxymethyl dithiobenzoate group prepared in the absence of blowing agent.

3 g of carboxymethyl vinyl-4 dithiobenzoate, 12.5 g of N-((trishydroxymethyl)methylacryl)amide, 9 g of acrylamide, 1.9 g of methylene bis(acrylamide) and 2.5 g of azo-bis-isobutyronitrile are dissolved in 100 ml of N-methylpyrrolidone. This solution is poured into 850 ml of vaseline oil containing 20 g triethyleneglycol monomethylether and 20 drops of SPAN80 ®. The mixture is maintained at 60° C. under nitrogen with vigorous mixing for 27 hours.

The yield of this operation is 85% for a copolymer possessing 0.052 meq/v of measurable acidic groups per gram with a degree of swelling of 2.8.

EXAMPLE 4

Copolymer of acrylamides bearing acid chloride groups: 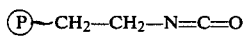.

6.7 g of acrylamide, 1.25 g of N(hydroxy-1-butyl)-2 acrylamide, 3.2 g of N-N'-methylene-bis(acrylamide), 2 g of azo-bis-isobutyronitrile and then 4.6 g of acryloyl chloride are dissolved in 75 ml of N-methylpyrrolidone. This solution is poured into 750 ml of vaseline oil containing 50 drops of SPAN 80. The mixture is maintained under nitrogen at 60° C. for 22 hours. The crosslinked polymer beads are then isolated, but cannot be purified by washing with water given the sensitivity of the acid chloride group to water; also the number of organic solvent washes, such as with methylene chloride, is increased. The acid chloride groups of the polymer obtained are measured by alkaline hydrolysis of ⓟ—COCl using an excess of base and measuring the unused base. Further, the total percentage of chlorine is measured. The results obtained show that practically all the acid chloride has been incorporated and remains reactive in the polymer. This type of gel is preferably used in anhydrous medium but, the hydrolysis being rather slow, it can be used to immobilize in aqueous medium molecules more nucleophilic than water.

EXAMPLE 5

Acrylamide copolymer with reactive isocyanate group.

ⓟ—CH₂—CH₂—N=C=O

This is performed as in example 4 but using 5.5 g of isocyanatoethylstyrene in place of the 4.6 g of acryloyl chloride, the group being relatively stable in aqueous medium in contrast to the preceding case the washes can be ended by a rapid water wash before the use of this gel as an immobilizing agent.

EXAMPLE 6

Copolymer of styrene and divinylbenzene bearing the methyl dithiobenzoate group.

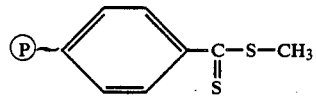

33.2 g of styrene, 4.2 g of divinyl-1,4 benzene and 4.2 g of methyl vinyl-4 dithiobenzoate are dissolved in a mixture of 70 ml of benzene and 30 ml of trimethyl-2,2,4 pentane. 3.5 g of azo-bis-isobutyronitrile are added and the solution is added to 550 ml of anhydrous ethyleneglycol containing 30 drops of SPAN 80. The mixture is maintained at 75° C. with vigorous stirring for 20 hours. The crosslinked polystyrene beads are then separated, washed in methanol and then in a chlorinated solvent such as chloroform, and then dried.

The polymer yield with respect to the weight of monomer introduced is 75%; all the the reactive monomer is incorporated.

EXAMPLE 7

Copolymers of styrene and divinyl benzene bearing the chlorocarbonate group.

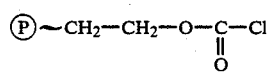

30.5 g of styrene, 4.2 g of divinyl-1,4 benzene and 2.2 g of vinyl chloroformiate are dissolved in a mixture of 80 ml of benzene and 18 ml of trimethyl-2,2,4 pentane. 3.1 g of azo-bis-isobutyronitrile are added and the solution is dispersed in 520 ml of anhydrous triethyleneglycol containing 30 drops of SPAN 80 ®.

The follow-up is achieved as in example 6 giving crosslinked polystyrene beads (73% yield) containing 85% of the reactive groups introduced in the form of vinyl chloroformiate.

EXAMPLE 8

Copolymer of styrene, chloromethylstyrene and divinylbenzene.

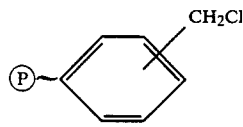

35.2 g of styrene, 4.6 g of divinylbenzene (mixture of isomers) and 2.5 g of chloromethylstyrene (mixture of isomers) are dissolved in a mixture of 85 ml of benzene and 15 ml of trimethyl-2,2,4 pentane. 3.5 g of azo-iso-isobutyronitrile are added and the solution is then added to 550 ml of anhydrous triethylene glycol.

The rest of the operation is performed as in examples 6 and 7 to obtain beads of chloromethylated crosslinked polystyrene (83% yield) containing 78% of the chloromethylbenzene groups introduced into the reaction medium in the form of chloromethylstyrene.

What we claim is:

1. A process for the preparation of crosslinked copolymers in beads, said copolymers bearing reactive groups that are capable of subsequently coupling a chemical or biochemical product or a cell, which comprises submitting to polymerisation, in the presence of a free-radical initiating agent, a mixture of free-radical polymerisable monomers including one or more monomers bearing said reactive groups, the polymerisation being carried out in a medium comprises of two emulsified, immiscible organic liquids, one of them serving as a solvent for the monomers and the initiating agent, and the other assuring the dispersion of this solution to obtain the copolymer in beads.

2. The process as set forth in claim 1, for the preparation of hydrophilic polymer, wherein the monomer mixture submitted to polymerisation comprises one or more polar monomers together with the monomer or monomers bearing the reactive group and the polymerisation is carried out in a reaction medium constituted from a polar solvent stable in the presence of free radicals and a saturated mineral or vegetable oil.

3. The process as set forth in claim 2, wherein said polar monomers comprise, on the one hand, one or more monomers which will form after polymerisation and backbone of the copolymer and are selected from the group consisting of acrylic and methacrylic acids, the amides, esters and nitriles of these acids and the cyanoacrylates, and, on the other hand, one or more crosslinkable monomers selected from the group consisting of a bis-acrylamide, a bis-acrylate, a polyalcohol polyacrylate, and a tris-alkyl-mellitate.

4. The process as set forth in claim 1, wherein the monomer mixture submitted to polymerisation comprises one or more slightly polar or apolar monomers together with the monomers bearing the reactive group and the polymerisation is carried out in a reaction medium constituted from a hydrocarbon solvent and a solvent selected from the group consisting of a glycol, its esters and ethers.

5. The process as set forth in claim 4, wherein the slightly polar or apolar monomers comprise a backbone monomer chosen among styrene and its derivatives, and a crosslinkable monomer which is divinylbenzene.

6. The process as set forth in claim 1, wherein a surface-active agent is added to the reaction medium.

7. The process as set forth in claim 1, wherein the polymerisation is effected in the presence of a blowing agent.

8. The process as set forth in claim 1, wherein one of the monomers present in the monomer mixture is a liquid which dissolves the other monomers of the mixture and the initiating agent, said monomer forming the organic liquid acting as the solvent.

9. The process of claim 3, wherein the polar solvent employed is dimethylformamide, N-methylpyrrolidone, hexamethylphosphotriamide, dimethylsulfoxide, a polyethylene glycol or a derivative thereof, an alkylene carbonate, an aliphatic nitrile or any other monomer solvent immiscible in oils.

10. The process as set forth in claim 1, wherein the monomer bearing the reactive group is selected among the styrenic dithioesters, and the vinyl thioester.

11. The process as set forth in claim 1, wherein the monomer bearing the reactive group is an acrylic or methacrylic acid chloride or a vinyl chloroformate.

12. The process as set forth in claim 1, wherein the monomer bearing the reactive group is a halogenoalkylstyrene or an isocyanatoalkylstyrene.

13. The process as set forth in claim 1, wherein the monomer bearing the reactive group is selected among the polymerizable amines, the derivatives thereof and the N-vinylamides.

14. The process as set forth in claim 10, wherein the monomer bearing the reactive groups is selected among methyl or carboxymethyl vinyl-4-dithiobenzoate, vinylpyridine, aminostyrene, and N-vinylacetamide.

15. The process set forth in claim 13, wherein the monomer bearing the reactive groups is selected among methyl or carboxymethyl vinyl-4-dithiobenzoate, vinylpyridine, aminostyrene, and N-vinylacetamide.

* * * * *